United States Patent
Kato

(10) Patent No.: US 10,013,271 B2
(45) Date of Patent: Jul. 3, 2018

(54) MANAGEMENT SYSTEM AND METHOD FOR CONTROLLING MANAGEMENT SYSTEM

(71) Applicant: CANON KABUSHIKI KAISHA, Tokyo (JP)

(72) Inventor: Kazunori Kato, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 237 days.

(21) Appl. No.: 14/966,792

(22) Filed: Dec. 11, 2015

(65) Prior Publication Data

US 2016/0170792 A1    Jun. 16, 2016

(30) Foreign Application Priority Data

Dec. 16, 2014  (JP) ................................ 2014-254602
Sep. 24, 2015  (JP) ................................ 2015-187460

(51) Int. Cl.
*G06F 9/455*    (2018.01)
*G06F 9/50*    (2006.01)

(52) U.S. Cl.
CPC ........ *G06F 9/45558* (2013.01); *G06F 9/5077* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 8,914,406 B1* | 12/2014 | Haugsnes | ........... | H04L 67/1097 382/305 |
| 8,918,510 B2* | 12/2014 | Gmach | ..................... | G06F 9/50 709/226 |
| 9,424,065 B2* | 8/2016 | Singh | ................... | G06F 9/45558 |
| 9,891,941 B2* | 2/2018 | Jul | ...................... | G06F 9/45558 |
| 2007/0043860 A1* | 2/2007 | Pabari | .................. | G06F 9/5072 709/224 |
| 2011/0119427 A1* | 5/2011 | Dow | ..................... | G06F 9/5088 711/6 |
| 2012/0101998 A1* | 4/2012 | Cahill | ................ | G06F 17/3089 707/654 |
| 2013/0036208 A1* | 2/2013 | Dochez | ................ | G06F 9/5077 709/220 |
| 2013/0174149 A1* | 7/2013 | Dasgupta | .............. | G06F 9/5072 718/1 |

(Continued)

FOREIGN PATENT DOCUMENTS

JP        2013-543171 A       11/2013

*Primary Examiner* — Hiren Patel
(74) *Attorney, Agent, or Firm* — Canon U.S.A., Inc. IP Division

(57) ABSTRACT

In a management system, an acquisition unit acquires information regarding adjustment of an amount of resources to be used for a first processing system according to an instruction for switching a processing system that processes a request transmitted from a predetermined network system. An adjustment instruction unit issues an instruction for increasing the number of virtual machines in a second processing system as an adjustment instruction to adjust an amount of resources in the second processing system based on this acquired information. The processing system that processes the request transmitted from the predetermined network system is switched according to this adjustment instruction.

16 Claims, 16 Drawing Sheets

(56) References Cited

U.S. PATENT DOCUMENTS

| | | | |
|---|---|---|---|
| 2013/0179895 A1* | 7/2013 | Calder | G06F 9/5077 |
| | | | 718/104 |
| 2013/0219385 A1* | 8/2013 | Geibel | G06F 9/45558 |
| | | | 718/1 |
| 2013/0227558 A1* | 8/2013 | Du | G06F 9/45558 |
| | | | 718/1 |
| 2013/0283364 A1* | 10/2013 | Chang | H04L 49/70 |
| | | | 726/12 |
| 2013/0290538 A1* | 10/2013 | Gmach | G06F 9/50 |
| | | | 709/226 |
| 2013/0326506 A1* | 12/2013 | McGrath | G06F 9/45558 |
| | | | 718/1 |
| 2014/0082612 A1* | 3/2014 | Breitgand | G06F 9/45533 |
| | | | 718/1 |
| 2014/0129700 A1* | 5/2014 | Mehta | H04L 43/0817 |
| | | | 709/224 |
| 2015/0058486 A1* | 2/2015 | Huang | H04L 47/70 |
| | | | 709/226 |
| 2015/0249615 A1* | 9/2015 | Chen | G06F 9/45558 |
| | | | 709/226 |
| 2015/0378765 A1* | 12/2015 | Singh | G06F 9/45558 |
| | | | 718/1 |
| 2016/0036924 A1* | 2/2016 | Koppolu | H04L 67/16 |
| | | | 709/224 |

\* cited by examiner

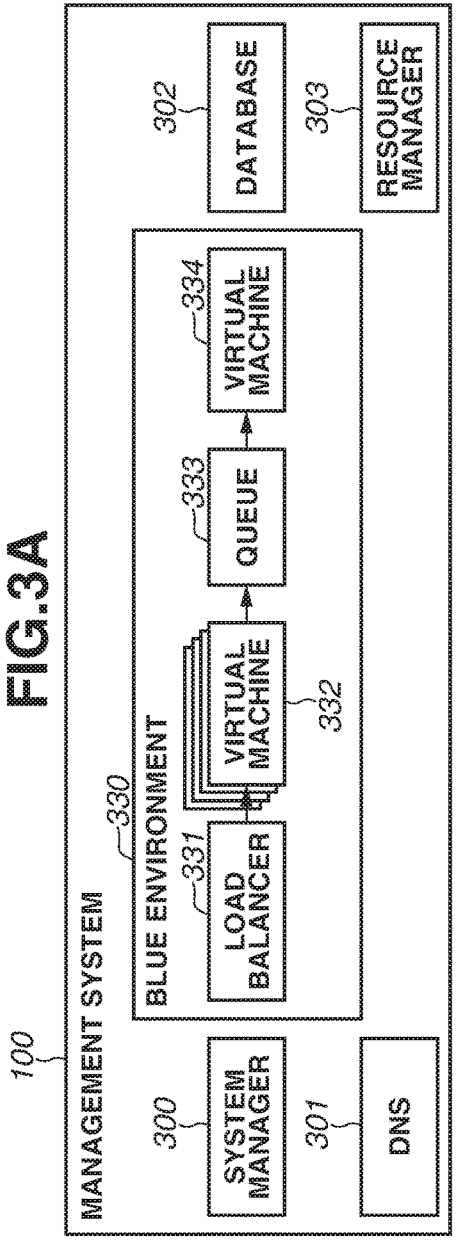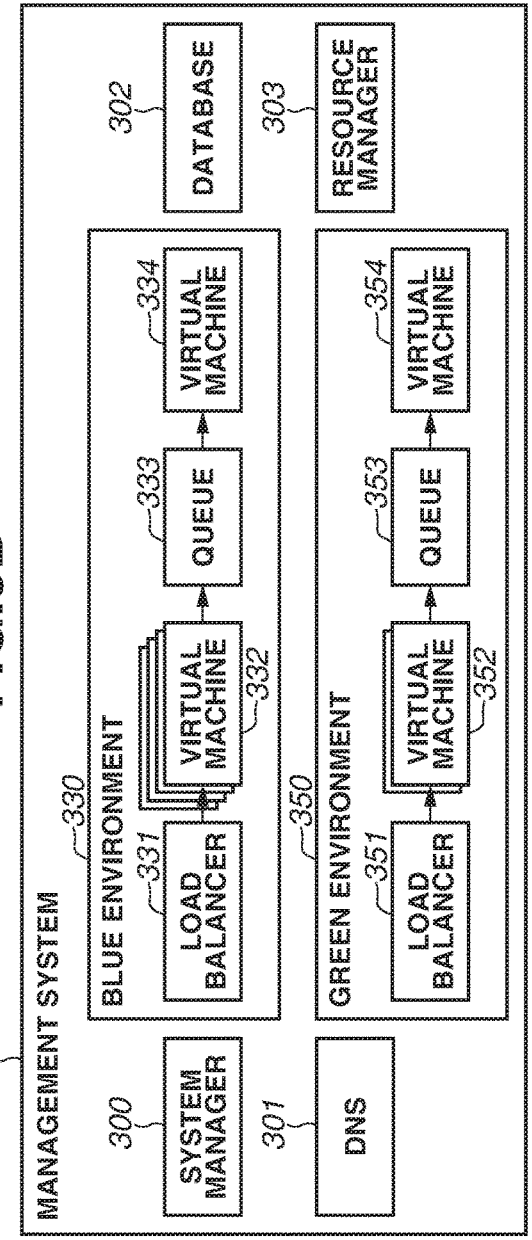

FIG.5

| RESOURCE ID (501) | TYPE (502) | TAG (503) | |
|---|---|---|---|
| R01 | LOAD BALANCER | "Role":"Web", "Version":"100" | ~511 |
| R02 | VIRTUAL MACHINE | "Role":"Web", "Version":"100" | ~512 |
| R03 | VIRTUAL MACHINE | "Role":"Web", "Version":"100" | ~513 |
| R04 | QUEUE | "Role":"Batch", "Version":"100" | ~514 |
| R05 | VIRTUAL MACHINE | "Role":"Batch", "Version":"100" | ~515 |
| R06 | VIRTUAL MACHINE | "Role":"Web", "Version":"100" | ~516 |
| R07 | VIRTUAL MACHINE | "Role":"Web", "Version":"100" | ~517 |
| R08 | VIRTUAL MACHINE | "Role":"Web", "Version":"100" | ~518 |
| R11 | LOAD BALANCER | "Role":"Web", "Version":"101" | ~519 |
| R12 | VIRTUAL MACHINE | "Role":"Web", "Version":"101" | ~520 |
| R13 | VIRTUAL MACHINE | "Role":"Web", "Version":"101" | ~521 |
| R14 | QUEUE | "Role":"Batch", "Version":"101" | ~522 |
| R15 | VIRTUAL MACHINE | "Role":"Batch", "Version":"101" | ~523 |

FIG.6

| MONITORING CONDITION NAME | MONITORED RESOURCE | MONITORED ITEM | PREVIOUSLY MEASURED VALUE | NUMBER OF SUCCESSIVE TIMES |
|---|---|---|---|---|
| S01-BatchQueueAlarmHigh | R04 | NumberOfMessages | 102 | 1 |
| S01-BatchQueueAlarmLow | R04 | NumberOfMessages | 102 | 0 |
| S01-WebCPUAlarmHigh | S01-WebAutoScalingGroup | CPUUtilization | 25 | 0 |
| S01-WebCPUAlarmLow | S01-WebAutoScalingGroup | CPUUtilization | 25 | 1 |
| S02-BatchQueueAlarmHigh | R14 | NumberOfMessages | 0 | 0 |
| S02-BatchQueueAlarmLow | R14 | NumberOfMessages | 0 | 0 |
| S02-WebCPUAlarmHigh | S02-WebAutoScalingGroup | CPUUtilization | 10 | 0 |
| S02-WebCPUAlarmLow | S02-WebAutoScalingGroup | CPUUtilization | 10 | 0 |

FIG.7

| AUTO-SCALING MANAGEMENT ID | TYPE | NUMBER OF REQUIRED DEVICES | NUMBER OF OPERATING DEVICES | SPECIFICATION | OPERATION PERFORMED LAST TIME | TAG |
|---|---|---|---|---|---|---|
| S01-WebAutoScalingGroup | AUTO-SCALING GROUP | 5 | 5 | | S01-WebScaleUpPolicy | "Role":"Web", "Version":"100" |
| R01 | LOAD BALANCER | | | | "Change Type=Medium" | "Role":"Web", "Version":"100" |
| S01-BatchAutoScalingGroup | AUTO-SCALING GROUP | 1 | 1 | | | "Role":"Batch", "Version":"100" |
| R04 | QUEUE | | | 1024 | "Change Size=1024" | "Role":"Batch", "Version":"100" |
| S02-WebAutoScalingGroup | AUTO-SCALING GROUP | 2 | 2 | | | "Role":"Web", "Version":"101" |
| R11 | LOAD BALANCER | | | | | "Role":"Web", "Version":"101" |
| S02-BatchAutoScalingGroup | AUTO-SCALING GROUP | 1 | 1 | | | "Role":"Batch", "Version":"101" |
| R14 | QUEUE | | | 64 | | "Role":"Batch", "Version":"101" |

FIG.8

| STACK ID | RESOURCE ID | |
|---|---|---|
| S01 | R01 | ~811 |
| S01 | R02 | ~812 |
| S01 | R03 | ~813 |
| S01 | R04 | ~814 |
| S01 | R05 | ~815 |
| S01 | R06 | ~816 |
| S01 | R07 | ~817 |
| S01 | R08 | ~818 |
| S02 | R11 | ~819 |
| S02 | R12 | ~820 |
| S02 | R13 | ~821 |
| S02 | R14 | ~822 |
| S02 | R15 | ~823 |

```
 2  Resources : {
 3       WebLB : {
 4            Type : "LoadBalancer",
 5            Properties : {
 6                 LoadBalancerName : "WebLB",
 7                 Listeners : [
 8                      {
 9                           LoadBalancerPort : "443",
10                           Protocol : "HTTPS",
11                           InstancePort : "80",
12                           InstanceProtocol : "HTTP",
13                      }
14                 ]
15                 Tags : [
16                      {
17                           Key : "Role",
18                           Value : "Web"
19                      }, {
20                           Key : "Version",
21                           Value : "100"
22                      }
23                 ]
24            }
25       },
26       WebAutoScalingGroup : {
27            Type : "AutoScalingGroup",
28            Properties : {
29                 LoadBalancerName :"WebLB",
30                 Cooldown : "300",
31                 DesiredCapacity : "2",
32                 MaxSize : "10",
33                 MinSize : "2",
34                 HealthCheckPeriod : "300",
35                 LaunchConfigurationName : "WebLaunchConfig",
36                 Tags : [
37                      {
38                           Key : "Role",
39                           Value : "Web"
40                      }, {
41                           Key : "Version",
42                           Value : "100"
43                      }
44                 ]
45            }
46       },
47       WebLaunchConfig : {
48            Type : "LaunchConfiguration",
49            Properties : {
50                 ImageId : "imageWeb100",
51                 InstanceType : "Large",
52            }
53       },
```

FIG.9B

```
54      WebScaleUpPolicy{
55              "Type" : "ScalingPolicy",
56              "Properties" : {
57                "AdjustmentType" : "ChangeInCapacity",
58                "AutoScalingGroupName" : "WebAutoScalingGroup",
59                "Cooldown" : "300",
60                "ScalingAdjustment" : "1"
61              }
62      }
63      WebScaleDownPolicy{
64              "Type" : "ScalingPolicy",
65              "Properties" : {
66                "AdjustmentType" : "ChangeInCapacity",
67                "AutoScalingGroupName" : "WebAutoScalingGroup",
68                "Cooldown" : "300",
69                "ScalingAdjustment" : "-1"
70              }
71      }
72      WebCPUAlarmHigh: {
73              Type: "Alarm",
74              Properties: {
75              AlarmDescription: "Scale-up if CPU > 90% for 10 minutes",
76              MetricName: "CPUUtilization",
77              Statistic: "Average",
78              Period: "300",
79              EvaluationPeriods: "2",
80              Threshold: "90",
81              ComparisonOperator:"GreaterThanThreshold"
82              AlarmAction: "WebScaleUpPolicy",
83              AutoScalingGroupName: "WebAutoScalingGroup"
84      },
85      WebCPUAlarmLow: {
86              Type: "Alarm",
87              Properties: {
88              AlarmDescription: "Scale-down if CPU < 30% for 10 minutes",
89              MetricName: "CPUUtilization",
90              Statistic: "Average",
91              Period: "300",
92              EvaluationPeriods: "2",
93              Threshold: "30",
94              ComparisonOperator: "LessThanThreshold"
95              AlarmAction: "WebScaleDownPolicy",
96              AutoScalingGroupName: "WebAutoScalingGroup"
97      },
```

FIG.9C

```
98      BatchQueue : {
99          Type : "Queue",
100         Properties : {
101             QueueName: "BatchQueue",
102         }
103         Tags : [
104             {
105                 Key : "Role",
106                 Value : "Batch"
107             }, {
108                 Key : "Version",
109                 Value : "100"
110             }
111         ]
112         }
113     },
114     BatchAutoScalingGroup : {
115         Type : "AutoScalingGroup",
116         Properties : {
117             Cooldown : "300",
118             DesiredCapacity : "1",
119             MaxSize : "10",
120             MinSize : "1",
121             HealthCheckPeriod : "300",
122             LaunchConfigurationName : "BatchLaunchConfig",
123             Tags : [
124                 {
125                     Key : "Role",
126                     Value : "Batch"
127                 }, {
128                     Key : "Version",
129                     Value : "100"
130                 }
131             ]
132         }
133     },
134     BatchLaunchConfig : {
135         Type : "LaunchConfiguration",
136         Properties : {
137             ImageId : "imageBatch100",
138             InstanceType : "Large",
139         }
140     }
```

FIG.9D

```
141    BatchScaleUpPolicy{
142        "Type" : "ScalingPolicy",
143        "Properties" : {
144            "AdjustmentType" : "ChangeInCapacity",
145            "AutoScalingGroupName" : "BatchAutoScalingGroup",
146            "Cooldown" : "300",
147            "ScalingAdjustment" : "1"
148        }
149    }
150    BatchScaleDownPolicy{
151        "Type" : "ScalingPolicy",
152        "Properties" : {
153            "AdjustmentType" : "ChangeInCapacity",
154            "AutoScalingGroupName" : "BatchAutoScalingGroup",
155            "Cooldown" : "300",
156            "ScalingAdjustment" : "-1"
157        }
158    }
159    BatchQueueAlarmHigh: {
160        Type: "Alarm",
161        Properties: {
162        AlarmDescription: "Number of Queue Message > 100 for 10 minutes",
163        MetricName: "NumberOfMessages",
164        Statistic: "Average",
165        Period: "300",
166        EvaluationPeriods: "2",
167        Threshold: "100",
168        ComparisonOperator:"GreaterThanThreshold"
169        AlarmAction: "BatchScaleUpPolicy",
170        QueueName: "BatchQueue"
171    },
172    BatchQueueAlarmLow: {
173        Type: "Alarm",
174        Properties: {
175        AlarmDescription: "Number of Queue Message < 20 for 10 minutes",
176        MetricName: "NumberOfMessages",
177        Statistic: "Average",
178        Period: "300",
179        EvaluationPeriods: "2",
180        Threshold: "20",
181        ComparisonOperator: "LessThanThreshold"
182        AlarmAction: "BatchScaleDownPolicy",
183        QueueName: "BatchQueue"
184    },
185 }
```

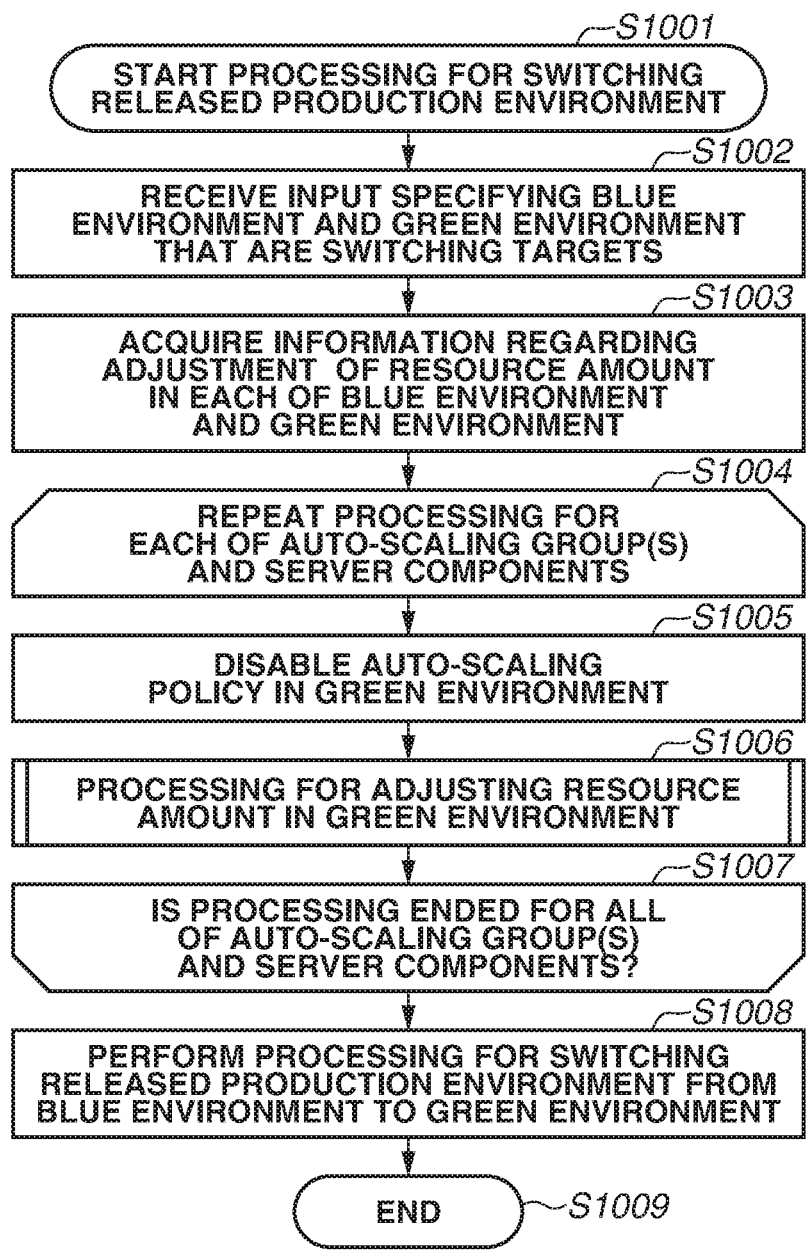

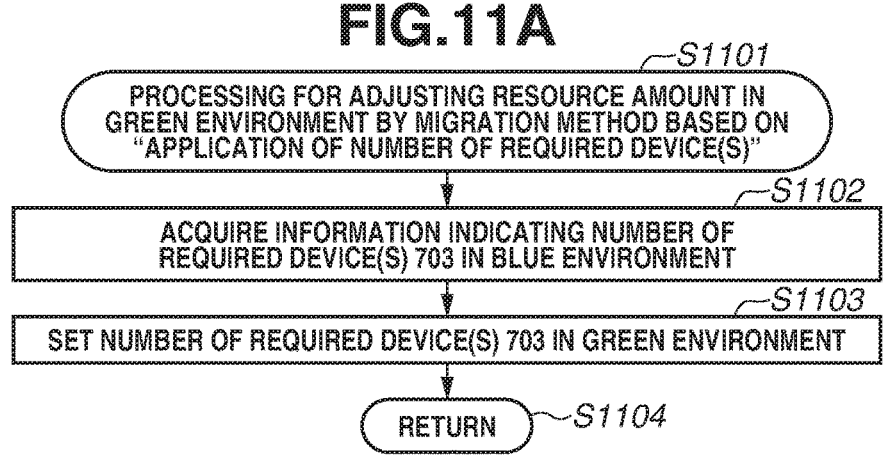
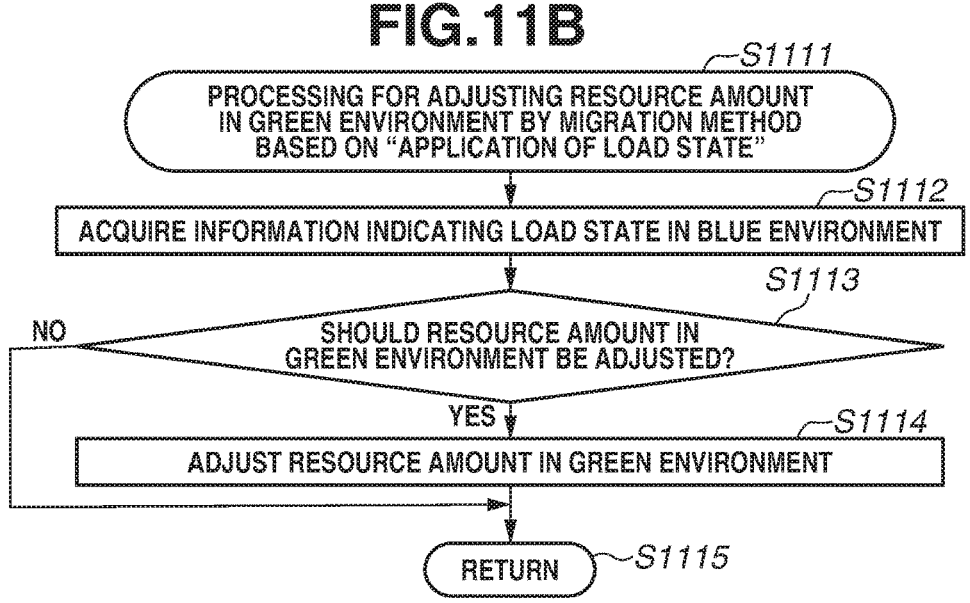
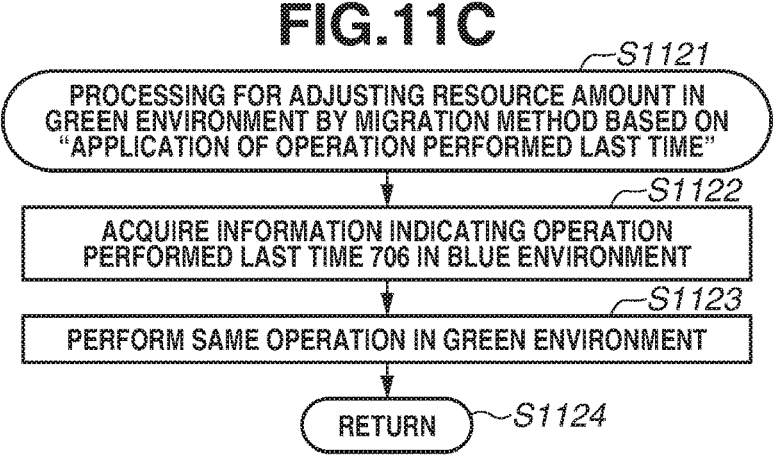

FIG.12

```
1  {
2  Resources : {
3      WebLB : {
4          Type : "LoadBalancer",
5          Properties : {
6              LoadBalancerName : "WebLB",
7              Listeners : [
8                  {
9                      LoadBalancerPort : "443",
10                     Protocol : "HTTPS",
11                     InstancePort : "80",
12                     InstanceProtocol : "HTTP",
13                 }
14             ]
15             Tags : [
16                 {
17                     Key : "Role",
```

```
181            ComparisonOperator: "LessThanThreshold"
182            AlarmAction: "BatchScaleDownPolicy",
183            QueueName: "BatchQueue"
184        },
185  }
186  MigrateSetting: [
187      {
188          TagKey:"Role",
189          TagValue:"Web",
190          MigrateMethod:"CopyDesiredCapacity",
191          CoolDown:"OFF",
192          DisableScaleIn:"3600"
193      },
194      {
195          TagKey:"Role",
196          TagValue:"Batch",
197          MigrateMethod:"None"
198      }
199  ]
200  }
```

FIG.13

| TYPE | MIGRATION METHOD | |
|---|---|---|
| LOAD BALANCER | PERFORM SAME OPERATION AS OPERATION PERFORMED LAST TIME | ~1311 |
| QUEUE | COPY LOAD STATE | ~1312 |

MANAGEMENT SYSTEM AND METHOD FOR CONTROLLING MANAGEMENT SYSTEM

BACKGROUND OF THE INVENTION

Field of the Invention

One disclosed aspect of the embodiments relates to a technique for adjusting a resource amount of resources included in a processing system when the processing system is switched.

Description of the Related Art

In recent years, there has been a cloud service as a service allowing a user to use various kinds of applications running on a server existing on the Internet. In the cloud service such as an Infrastructure as a Service (IaaS) and a Platform as a Service (PaaS), a cloud service vendor provides a resource such as a virtual machine and a storage to a system administrator via a network. The virtual machine is a logical computer established by dividing a server by a logical unit irrespective of a physical configuration with use of a virtualization technique, and configured in such a manner that each logical computer operates while having an independent operating system. The system administrator can construct a system for providing an individual service with use of the resource such as the virtual machine and the storage provided by the cloud service vendor.

The system constructed with use of the cloud service can automatically adjust a resource amount based on an amount of received requests and a load for processing these requests according to a setting arbitrarily made by the system administrator. For example, Japanese Unexamined Patent Application Publication (Translation of PCT Application) No. 2013-543171 discusses an auto-scaling function of automatically allocating a resource necessary to execute a program, and changing the allocated resource after the execution of the program is started.

Such processing for adjusting the resource amount is performed by a resource manager prepared in the cloud service. The amount of requests means the number of requests received by a load balancer per unit time. The load for processing means a load imposed for processing in the virtual machine, and refers to a central processing unit (CPU) usage rate and a memory usage rate, a time taken to return a response, and the like of the virtual machine. The adjustment of the resource amount includes, for example, scaling-out, which increases the number of virtual machines, and scaling-up, which increases an allocation of hardware resources to the virtual machine. Further, the adjustment of the resource amount also includes scaling-in, which reduces the number of virtual machines, and scaling-down, which reduces the allocation of the hardware resources to the virtual machine. The hardware resources are a CPU, a memory, the storage, and the like. Further, the load balancer can also automatically carry out the scaling-out and the like based on the amount of received requests.

Further, in recent years, a technique called a Blue-Green deployment has been used sometimes, at the time of, for example, a version upgrade of the system constructed with use of the above-described cloud service. The version upgrade of the system includes, for example, a version upgrade of an application executed on the virtual machine in the system. The system after the version upgrade is equipped with an additional function that the system can provide, and/or is changed in type and/or format of data that the system manages.

Now, the Blue-Green deployment will be described.

First, a processing system as a released production environment, which is currently in charge of receiving requests from an external network and processing these requests, is operating in the cloud service. The processing system includes at least one or more virtual machines configured to process the requests, and the load balancer that functions as a load distribution device configured to distribute the requests to the virtual machines. Then, when it is desired to upgrade the version of this processing system, a processing system after the version upgrade that is different from the processing system of the current version is further constructed in the cloud service. After that, once it has come to a timing when it is desired to upgrade the version, for example, a setting of a connection destination indicating a target of the transmission of the requests from the external network is changed in the cloud service, by which the processing system serving as the released production environment is switched. At this time, the released production environment is switched to the processing system after the version upgrade. The version upgrade of the system is realized by this switching.

The processing system in which the above-described system of the current version is in operation, i.e., the processing system before the switching is called a Blue environment. On the other hand, the processing system in which the above-described system after the version upgrade is constructed, i.e., the processing system after the switching is called a Green environment. Hereinafter, the Blue environment and the Green environment may be referred to as a first processing system and a second processing system, respectively.

The switching of the processing system by the Blue-Green deployment can be also used in a situation other than the above-described version upgrade of the system. For example, this switching can be used when the environment that processes the requests is switched from a processing system where a failure or a bug occurs (in this case, the first processing system) to another normally operating processing system (in this case, the second processing system).

A system such as the above-described system may be, for example, planned to be upgraded several times in a day. For such a system, because a next timing for the version upgrade comes soon, it is difficult to carry out the above-described switching of the processing system in consideration of a transition of the amount of requests and the like.

Further, it may be impossible to largely postpone a date when the system of the new version will be released, in view of a system operation. Therefore, even at the moment that a large number of requests are received from the external network and a heavy load for the processing is imposed on the first processing system, the processing for switching the processing system that processes these requests may have to be performed for the version upgrade or the like.

When the load for the processing regarding the requests imposed on the first processing system is large, the above-described resource manager performs the adjustment processing so that a large number of resources are provided to the load balancer or the like that processes the requests in the first processing system. On the other hand, the processing for adjusting the resources is not performed by the resource manager in the second processing system that is prepared in advance in anticipation of the switching for the version upgrade, because the second processing system does not yet receive the requests from the external network and does not process the received requests.

Further, the second processing system prepared in advance may include a relatively small resource amount in a case where the system administrator takes into consideration saving cost to maintain the system. Performing the above-described switching processing under such a situation results in the second processing system receiving a large number of requests at once. Then, a possible consequence therefrom is that the second processing system falls behind in processing the requests if the resource manager cannot perform the processing for adjusting the resources in time.

SUMMARY OF THE INVENTION

One disclosed aspect of the embodiments is directed to a management system and a method for controlling the management system capable of preventing the second processing system from falling behind in processing the requests at the time of the processing for switching the processing system from the first processing system to the second processing system.

According to an aspect of the embodiments, a management system including a plurality of processing systems each including at least one or more virtual machines each configured to process a request, and a load distribution device configured to distribute the request to the virtual machine(s), includes an acquisition unit configured to acquire information regarding adjustment of an amount of resource to be used for a first processing system according to an instruction for switching a processing system that processes the request transmitted from a predetermined network system from the first processing system to a second processing system included in the plurality of processing systems, and an adjustment instruction unit configured to issue an instruction for increasing the number of the virtual machines in the second processing system as an adjustment instruction to adjust an amount of resource in the second processing system based on the information acquired by the acquisition unit, wherein the processing system that processes the request transmitted from the predetermined network system is switched from the first processing system to the second processing system according to the adjustment instruction issued by the adjustment instruction unit.

Further features of the disclosure will become apparent from the following description of exemplary embodiments with reference to the attached drawings.

BRIEF DESCRIPTION OF THE DRAWINGS

FIGS. 3A and 3B each illustrate an example of a configuration of a management system.

FIG. 5 illustrates a resource information management table.

FIG. 6 illustrates a monitoring state management table.

FIG. 7 illustrates an auto-scaling state management table.

FIG. 8 illustrates a stack information management table.

FIGS. 9A, 9B, 9C, and 9D illustrate one example of a stack template.

FIG. 10 is a flowchart illustrating a flow of processing for switching a released production environment.

FIGS. 11A, 11B, and 11C each are a flowchart illustrating a flow of processing for adjusting a resource amount in a Green environment.

FIG. 12 illustrates one example of the stack template.

FIG. 13 illustrates a migration method table.

DESCRIPTION OF THE EMBODIMENTS

In the following description, exemplary embodiments for embodying the disclosure will be described with reference to the drawings.

The exemplary embodiments will be described based on a management system that manages a plurality of customers and a network device owned by each of the customers from a remote place via a network, as a network system constructed with use of the cloud service, by way of example. The management system collects device information and operation information such as log information and failure information from the network device existing in a customer network environment established for each of the customers to analyze them, thereby providing various device management services. More specifically, the management system provides a service of reporting an operation status of the network device, and a service necessary to repair the network device at fault. The management system is configured to receive requests to, for example, newly register a network device that will be handled as a management target, create a report, and register the log information of the network device via the network or the like to provide the services.

Further, there may be a customer administrator to which the management of the customer's device and the like is outsourced from the customer. In this case, the customer administrator manages the device owned by each of the customers and provides various services to this customer with use of the management system. Users of the management system include the customer administrator and the customers.

Figure 1:
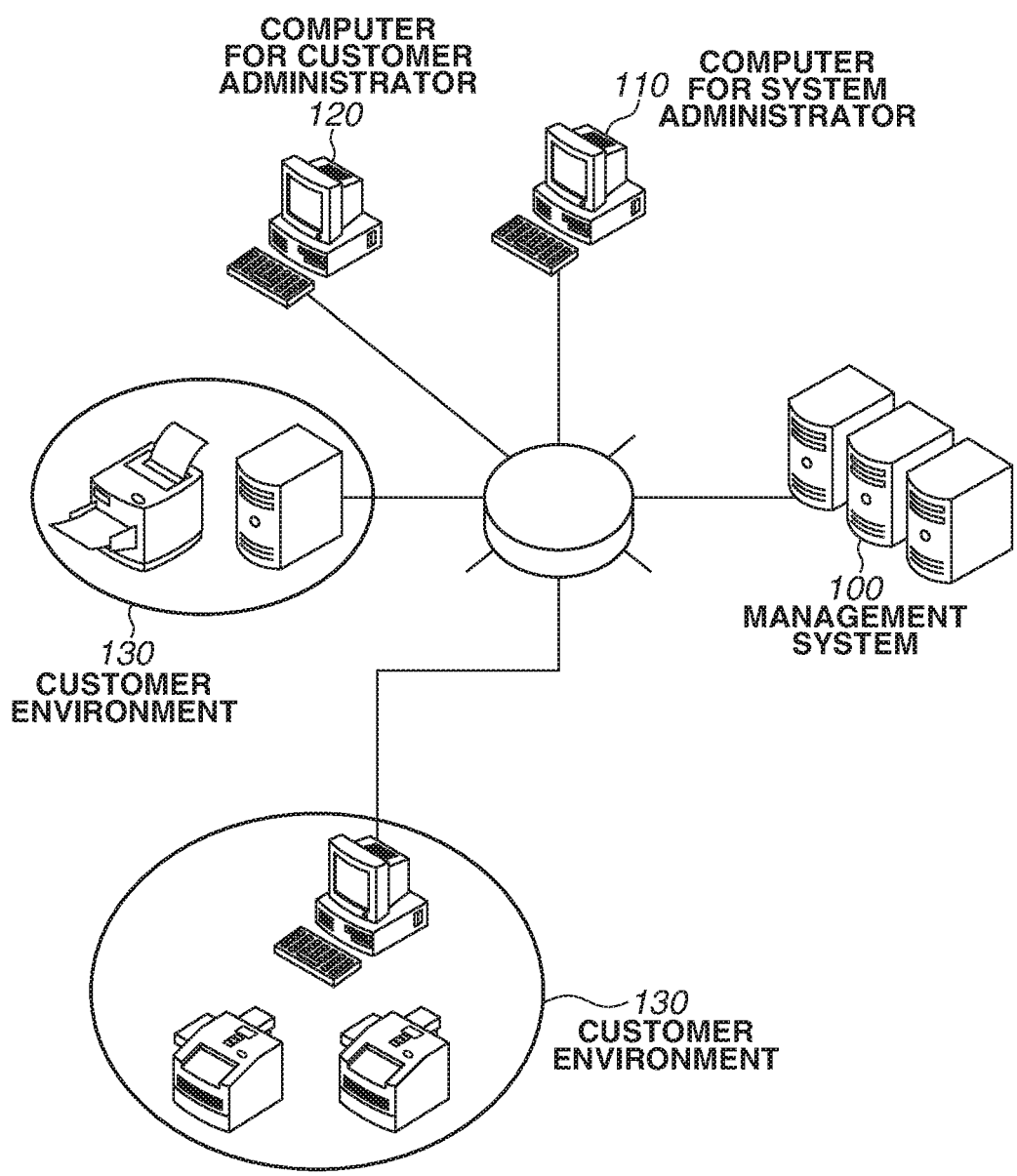
FIG. 1 illustrates an overview of a system configuration according to an exemplary embodiment.

FIG. 1 illustrates an overview of a configuration of an entire system. A management system 100, which manages the network devices and customer information, and a plurality of customer environments 130, each of which includes the network device installed therein, are connected to each other via a network such as the Internet. Further, a computer 110 for the system administrator, which is used to manage the management system 100, and a computer 120 for a person in charge in a sales company of the network device (the customer administrator) are also connected to the management system 100 via the network.

The management system 100 is a system that is constructed with use of a platform and a resource provided by the cloud service such as the IaaS and the PaaS, and provides a service for managing the network devices and the customers owning them. As the resource, the cloud service provides, for example, a plurality of virtual machines, a storage, and the like that operate on a server computer existing in a data center in the Internet. The virtual machines each are the logical computer established by dividing the server by the logical unit irrespective of the physical configuration with use of the virtualization technique, and configured so that each logical computer operates while having the independent operating system. Execution of various application programs on the plurality of virtual machines realizes various management services as the management system 100. Specific examples of the service content include a service of managing the device information of the network device installed in the customer environment 130 in association with the information about this customer when collecting this device information. Another example is a service of reporting for the customer and the person in charge in the sales company by collecting the operation information such as the log information and the failure information of the network device installed in the customer environment 130 and analyzing the collected operation information. Still another example is a service of notifying the person in charge in the sales company of information necessary to repair the network device at fault via an electronic mail or the like. Examples of the network device include an image processing apparatus, such as a printer and a network camera. Types of the printer include an electrophotographic printer with use of toner or the like, and an inkjet printer that prints data with use of ink. The management system 100 can even collect the operation information specific to each of the printing methods (for example, a toner use amount and an ink use amount), and provide a different management service.

The computer 110 is a computer used by the system administrator, and can display a management screen for the administrator that is provided by the management system 100, with use of an installed web browser or the like. The system administrator can issue an instruction to transmit a request for, for example, configuring various kinds of settings to the management system 100 via the management screen displayed on the computer 110. For example, the system administrator can issue an instruction to transmit a request for generating the Green environment for the above-described Blue-Green deployment, or a request for switching the request processing system from the Blue environment to the Green environment. The processing system includes at least one or more virtual machines configured to process the requests, and the load balancer that functions as the load distribution device configured to distribute the requests to the virtual machine(s).

The computer 120 is a computer used by the person in charge in the sales company of the network device, and can display a screen for the person in charge that is provided by the management system 100, with use of a web browser or the like. Examples of the screen for the person in charge that is provided by the management system 100 include a screen that allows the person in charge to confirm the operation information such as the log information and the failure information of the network device installed in the customer environment 130. Besides that, the computer 120 can also display a screen for configuring a setting of monitoring the network device installed in the customer environment 130, as the screen for the person in charge.

The customer environment 130 indicates a network environment that exists in the network for each of the customers managed by the management system 100. In the customer environment 130, one or more network devices owned by the customer, and a relay apparatus that relays communication between the network devices and the management system 100 are connected to each other via a local area network (LAN). The relay apparatus has a function of searching for a network device in the network, and, if finding any network device, and of generating and transmitting a request for notifying the management system 100 of the device information of this network device. Further, this relay apparatus has a function of generating a request for notifying the management system 100 of the operation information collected from the network device, and transmitting the generated request. The present system may include a plurality of computers 120 and a plurality of customer environments 130.

Figure 2:
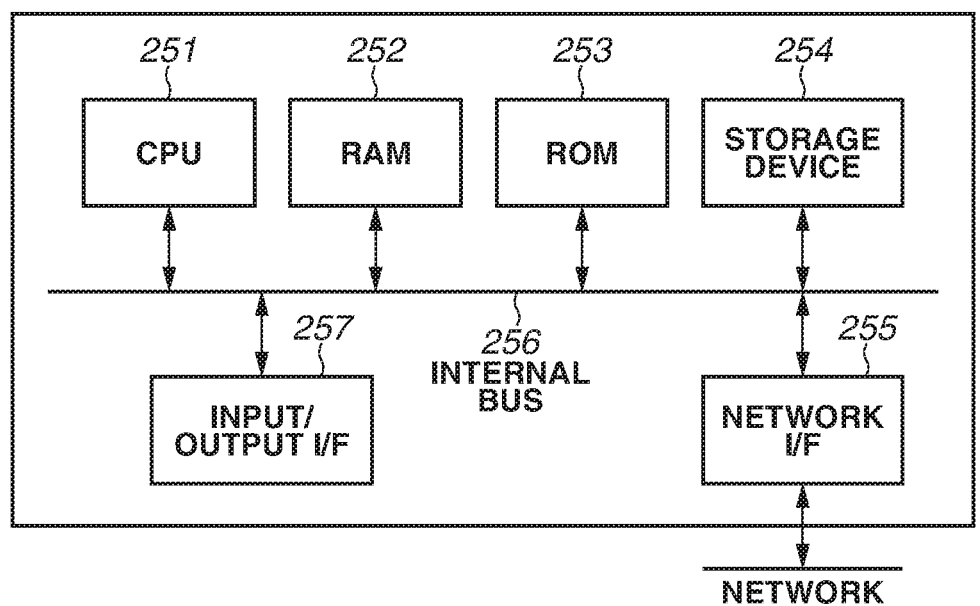
FIG. 2 illustrates an example of a hardware configuration of an information processing apparatus.

FIG. 2 illustrates an example of a hardware configuration of an information processing apparatus. The information processing apparatus according to the present exemplary embodiment corresponds to the server computer existing in the data center for realizing the management system 100, the computer 110, the computer 120, a computer serving as the relay apparatus existing in each of the customer environments 130, and the like.

The information processing apparatus includes a CPU 251 that executes a program stored in a read only memory (ROM) 253, and comprehensively controls each device via an internal bus 256. A random access memory (RAM) 252, the ROM 253, a storage device 254, a network interface (I/F) 255, and an input/output I/F 257 are connected to the internal bus 256. Further, the input/output I/F 257 includes, for example, a PS/2 or a Universal Serial Bus (USB I/F), and an analog or digital display I/F. The input/output I/F 257 allows a keyboard, a mouse, a cathode-ray tube (CRT) or liquid crystal display, and the like, which are not illustrated, to be connected to the information processing apparatus. The information processing apparatus performs communication via the LAN, an intranet environment, or the Internet, with use of the network I/F 255. This communication allows the information processing apparatus to communicate with the network device and another information processing apparatus. The CPU 251 performs processing for executing the program together with the RAM 252 and the ROM 253. Further, the CPU 251 can also execute a program for realizing the virtualization technique. Further, the CPU 251 performs processing for recording data into a recording medium such as the storage device 254. The storage device 254 functions as an external storage device. Besides storing various kinds of information, the storage device 254 can also store various kinds of system information and processing information in place of the RAM 252.

FIGS. 3A and 3B each illustrate an example of a configuration of the management system 100. The management system 100 is constructed and managed by the system administrator who operates the computer 110, and processes the requests transmitted from the computer 120 operated by the customer administrator, and the network devices and the relay apparatuses in the customer environments 130 to provide the services.

FIG. 3A illustrates the management system 100 before a Green environment 350 is generated. In FIG. 3A, the management system 100 includes a system manager 300, a Domain Name System (DNS) 301, a database 302, a resource manager 303, and a Blue environment 330. On the other hand, FIG. 3B illustrates the management system 100 after the Green environment 350 is generated. The configuration of the management system 100 illustrated in FIG. 3B is the configuration of the management system 100 illustrated in FIG. 3A with the Green environment 350 added thereto. The Green environment 350 replaces the Blue environment 330 to become the released production environment after an operation check and a test is conducted. Processing for switching the released production environment will be described below with reference to FIG. 10.

Address information, such as an Internet Protocol (IP) address, and a host name of each of the virtual machines and the load balancer are registered in the DNS 301. The computer 110 for the system administrator, the computer 120 for the customer administrator, and the computers and the network devices in the customer environments 130 communicate with the DNS 301 via the network, such as the Internet. These computers and network devices inquire for the address information corresponding to the host name of the load balancer in the processing system, which is set as a connection destination for the requests, to the DNS 301, and transmit the requests to the address information returned from the DNS 301. In response to the received inquiries, the DNS 301 returns the host name or the address information indicating the load balancer in the processing system, which is set as the connection destination for the requests, with use of a DNS record associated with a DNS name. Each of the virtual machines included in the management system 100 has the address information, such as a unique IP address. Therefore, the address information of this load balancer can be identified based on the address information of the virtual machine serving as the load balancer.

The database 302 stores a program for realizing the present management system 100, various kinds of data for providing the services, respective tables illustrated in FIGS. 5 to 8 and 13, which will be described below, and the like.

The system manager 300 receives, for example, a request regarding a setting of the processing system in the management system 100 from the computer 110 for the system administrator. The system manager 300 issues an instruction to the resource manager 303 based on the request from the system administrator. For example, the system manager 300 issues an instruction to generate a resource that forms a processing system and the processing system using this resource, and an adjustment instruction for adjusting a resource amount.

The resource manager 303 generates or deletes the resource that forms the processing system, and performs the processing for adjusting the resource amount in the management system 100, based on the instruction from the system manager 300. The adjustment of the resource amount includes, for example, the scaling-out, which increases the number of virtual machines, and the scaling-up, which increases the allocation of the hardware resources to the virtual machine. Further, the adjustment of the resource amount also includes the scaling-in, which reduces the number of virtual machines, and the scaling-down, which reduces the allocation of the hardware resources to the virtual machine. The hardware resources are the CPU (the number of cores), the memory (a size), the storage (a size), and the like.

The resource manager 303 can also automatically adjust the resource amount by monitoring an amount of requests transmitted to the Blue environment 330. The amount of requests means the number of requests received by a load balancer 331 in the Blue environment 330 per unit time. Further, the resource manager 303 may be configured to automatically adjust the resource amount by monitoring a processing load imposed on the Blue environment 330. The processing load means the load spent for the processing in the virtual machine, and refers to the CPU usage rate and the memory usage rate, the time taken to return a response, and the like of the virtual machine. The term "auto-scaling" is used to refer to the adjustment of the resource amount that is carried out by the resource manager 303 when the monitored amount of requests or the monitored processing load meets a preset condition.

Further, the resource manager 303 switches the released production environment by, for example, rewriting the DNS record registered in the DNS 301 according to an instruction from the system manager 300. A method for switching the released production environment will be described in detail in paragraphs describing a switching unit 405 illustrated in FIG. 4.

The Blue environment 330 is a processing system where the application of the current version runs, and includes the load balancer 331, virtual machines 332 and 334, and a queue 333. An application running in the Green environment 350 is the application of the upgraded version with at least one function added or extended compared to the application running in the Blue environment 330. The Green environment 350 is a processing system including a load balancer 351, virtual machines 352 and 354, and a queue 353. Each of the Blue environment 330 and the Green environment 350 may include, for example, a plurality of load balancers 331 or 351, pluralities of virtual machines 332 and 334, or 352 and 354.

In the Blue environment 330, the load balancer 331 is a load distribution device that distributes the received requests to the virtual machine 332. The distribution may follow some balancing criteria, such as equality balancing. The virtual machine 332 is a request processing system in the Blue environment 330, and a web server or the like that receives and processes the requests. The queue 333 is a queue for managing messages corresponding to the requests processed by the virtual machine 332. The virtual machine 334 is a batch processing system in the Blue environment 330, and a batch server or the like that processes (performs batch processing on) the queued messages in the queue 333. The request processing by the virtual machine 332 and the batch processing by the virtual machine 334 are performed asynchronously.

In the Green environment 350, the load balancer 351 is a load distribution device that distributes the received requests to the virtual machine(s) 352. The distribution may follow some balancing criteria, such as equality balancing. The virtual machine 352 is a request processing system in the Green environment 350, and a web server or the like that receives and processes the requests. The queue 353 is a queue for managing messages corresponding to the requests processed by the virtual machine 352. The virtual machine 354 is a batch processing system in the Green environment 350, and a batch server or the like that processes (performs the batch processing on) the queued messages in the queue 353. The request processing by the virtual machine 352 and the batch processing by the virtual machine 354 are performed asynchronously.

The management system 100 can also include a plurality of Green environments 350. When switching the released production environment, the system administrator can also select one of the plurality of prepared Green environments 350.

Figure 4:
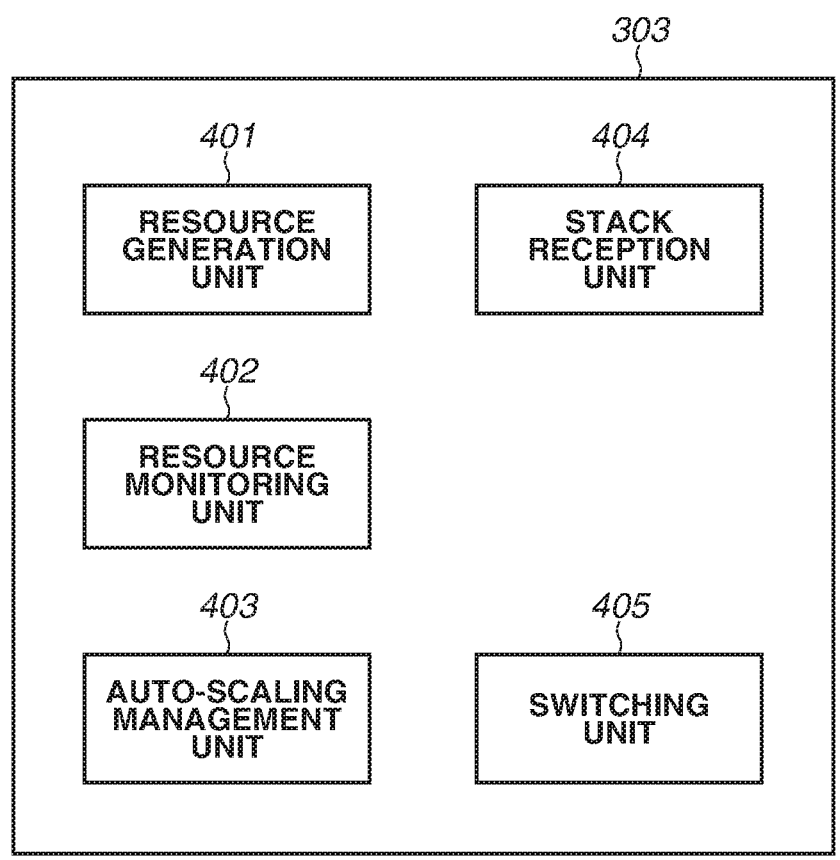
FIG. 4 illustrates an example of a configuration of a resource manager.

FIG. 4 illustrates an example of a configuration of the resource manager 303 according to the present exemplary embodiment. The resource manager 303 includes a resource generation unit 401, a resource monitoring unit 402, an auto-scaling management unit 403, a stack reception unit 404, and a switching unit 405.

The resource generation unit 401 receives the request issued from the system administrator to the resources of the management system 100, and generates the virtual machines 332, 334, 352, and 354, and server components based on the request. The system administrator can request the resource generation unit 401 to generate the virtual machines 332, 334, 352, and 354 and make them usable. The resource generation unit 401 receives the request from the system administrator by various kinds of methods. For example, the resource generation unit 401 may be configured to receive the request from the system administrator with use of a graphical user interface (GUI), an application programming interface (API), or the like provided by the management system 100. The request from the system administrator includes the number, types, and the like of the virtual machines 332, 334, 352, and 354.

The virtual machines 332, 334, 352, and 354 each can include an operating system (OS), an application server, a system and application configuration, and the like selectable by the system administrator. The server components include the load balancers 331 and 351, the queues 333 and 353, and the like, but are not limited thereto. After the management system 100 generates the virtual machines 332, 334, 352, and 354 that satisfy the request from the system administrator, the system administrator can change settings of the virtual machines 332, 334, 352, and 354. For example, the system administrator can change an amount or a type of a storage device or a network bandwidth relating to each of the virtual machines 332, 334, 352, and 354.

The resource monitoring unit 402 monitors statuses, capabilities, and the like of the virtual machines 332, 334, 352, and 354, and the server components. For example, the resource monitoring unit 402 monitors the number of requests per unit time for each of the load balancers 331 and 351, the CPU usage rate, the memory usage rate, and/or the like for each of the virtual machines 332, 334, 352, and 354, and the number of unprocessed messages and/or the like for each of the queues 333 and 353, as a monitored item. The resource monitoring unit 402 is connected to the Blue environment 330 and the Green environment 350, and acquires information about the above-described monitored item. At this time, the resource monitoring unit 402 is connected to the Blue environment 330 and the Green environment 350 via a network (not illustrated) in the management system 100.

If the monitored item meets a condition predetermined by the system administrator (defined in a stack template illustrated in FIG. 9B, which will be described below) as a result of the monitoring, the resource monitoring unit 402 issues an Alarm event. The auto-scaling management unit 403 receives the Alarm event, and generates the virtual machine(s), the server component(s), or the like in response to this Alarm event.

The auto-scaling management unit 403 manages the auto-scaling of the virtual machines 332, 334, 352, and 354, and the server components. The auto-scaling management unit 403 manages the virtual machines 332, 334, 352, and 354, and the server components, which are handled as targets of the auto-scaling, in group units. This group will be referred to as an auto-scaling group herein. For example, the auto-scaling management unit 403 manages the plurality of existing virtual machines 332 as one auto-scaling group.

The auto-scaling management unit 403 connects the virtual machines 332, 334, 352, and 354 belonging to the auto-scaling groups to the load balancers 331 and 351, respectively, and the auto-scaling groups are associated with the load balancers 331 and 351, respectively. The load balancers 331 and 351 transmit the requests received from outside while distributing these requests to the virtual machines 332 and 352, respectively, and the virtual machines 332 and 352 process the received requests.

The auto-scaling management unit 403 controls the auto-scaling so that the number of the virtual machines, or the server components belonging to the auto-scaling group and being in operation matches the number of devices set as the number of required devices. The number of required devices is determined based on the request from the system administrator. The number of required devices may be set in advance by a vendor of the cloud service.

If the number of operating devices is smaller than the number of required devices, the auto-scaling management unit 403 requests the resource generation unit 401 to generate the virtual machine(s), and adds the generated virtual machine(s), or the like to the corresponding auto-scaling group. If the auto-scaling group is associated with the load balancer 331 or 351, the auto-scaling management unit 403 connects the added virtual machine(s) to the corresponding load balancer 331 or 351.

On the other hand, if the number of operating devices is larger than the number of required devices, the auto-scaling management unit 403 deletes the virtual machine(s) from the auto-scaling group, and requests the resource generation unit 401 to stop the virtual machine(s). If the auto-scaling group is associated with the load balancer 331 or 351, the auto-scaling management unit 403 requests a termination of the connection between the virtual machine(s) that the auto-scaling management unit 403 attempts to delete, and the corresponding load balancer 331 or 351. The load balancer 331 or 351 stops transmitting the request to the virtual machine(s) that the auto-scaling management unit 403 attempts to delete, and terminates the connection between this virtual machine(s) and the load balancer 331 or 351 after a currently processed request is cleared. The auto-scaling management unit 403 requests the resource generation unit 401 to stop the virtual machine 332 or 352 after the virtual machine 332 or 352 is disconnected from the load balancer 331 or 351.

Further, a term "auto-scaling policy" will be used herein to refer to processing for setting the number of required devices in the auto-scaling group when the resource monitoring unit 402 issues the Alarm event. The system administrator specifies the number of required devices so as to, for example, increase the number of required devices by one, reduce the number of required devices by one, or set the number of required devices to 20. The resource monitoring unit 402 contributes to the adjustment of the resource amount according to the request from the system administrator. Further, the auto-scaling management unit 403 manages information about an auto-scaling state. The information about the auto-scaling state includes the number of virtual machines, a specification(s) thereof, an auto-scaling operation performed last time, and the like.

The stack reception unit 404 receives the request to generate or delete the virtual machine(s), the server component(s), and the like from the system administrator with use of the API or the like by the computer 110. At this time, the stack reception unit 404 receives the stack template, and requests the resource generation unit 401 to generate the virtual machine(s), and the server component(s) written in the stack template. The stack template is a template in which the request from the system administrator is written with respect to the generation of the virtual machine(s), and the server component(s). The stack template will be described below with reference to FIGS. 9A to 9D. A stack refers to a collection of the virtual machines, and the server components generated based on a same stack template. In the present example, each of the generation of the virtual machine(s) and the server component(s) in the Blue environment 330, and the generation of the virtual machines and the server component(s) in the Green environment is written in a single stack template.

The stack reception unit 404 receives the stack template configured as described above, and requests the resource generation unit 401 to generate the virtual machine(s), and the server component(s). Further, the stack reception unit 404 adds the monitoring conditions to the resource monitoring unit 402, and registers the information regarding the auto-scaling with the auto-scaling management unit 403. The processing at this time results in the generation of the Green environment 350 illustrated in FIG. 3B.

When the instruction to switch the environment is issued from the system administrator, the switching unit 405 receives specified stack identifications (IDs) 801 of the Blue environment 330 and the Green environment 350, acquires the information regarding the adjustment of the resource amount in the Blue environment 330, and then reflects the acquired information in the Green environment 350. After completion of the processing for adjusting the resources in the Green environment 350, the switching unit 405 changes the setting of the DNS 301, thereby switching the released production environment from the Blue environment 330 to the Green environment 350.

The switching unit 405 switches the released production environment from the Blue environment 330 to the Green environment 350. The switching of the released production environment is realized by, for example, a change in the record in the DNS 301 from a record indicating the Blue environment 330 to a record indicating the Green environment 350. For example, in a case where the host name of the service is www.a-service.com, the following record is registered while the Blue environment 330 is serving as the released production environment: www.a-service.com CNAME 1b-R01.cloudservice.com. In this record, 1b-R01.cloudservice.com is the host name of the load balancer 331 in the Blue environment 330. This host name of the load balancer 331 is rewritten into 1b-R02.cloudservice.com, which is the host name of the load balancer 351 in the Green environment 350, when the released production environment is switched. The record in the DNS 301 is changed to the following record: www.a-service.com CNAME 1b-R02.cloudservice.com. Changing the record in the DNS 301 in this manner allows the switching unit 405 to switch the service that is the connection destination from the Blue environment 330 to the Green environment 350 without changing a Uniform Resource Locator (URL) for access from the computer 120 and the like connected from outside the management system 100.

Further, the resource manager 303 rewrites the DNS record registered in the DNS 301 according to the instruction from the system manager 300. Rewriting the DNS record causes a change in the connection destination for the requests from a predetermined network such as the computer 120 for the customer manager, and the computers and the network devices in the customer environments 130, thereby allowing the released production environment to be switched.

Examples of the method for changing the connection destination for the requests include a method that prepares a load balancer or a reverse proxy as an access point, and a method that rewrites the URL for accessing the system, besides the above-described method.

FIG. 5 illustrates a resource information management table according to the present exemplary embodiment. Numbers placed at a right end of the table indicates record numbers, and the same applies to the respective tables illustrated in FIGS. 6 to 8 and 13. Items of the resource information management table include a resource ID 501, a type 502, and a tag 503. The resource generation unit 401 manages resource information, for example, as indicated by records 511 to 523. The resources mean the resources provided by the cloud service, and include the virtual machines 332, 334, 352, and 354, and the server components.

The resource ID 501 is an identifier for identifying the resource generated by the resource generation unit 401. The type 502 indicates a type of the resource generated by the resource generation unit 401. Examples of the type of the resource include the virtual machine, the load balancer, and the queue. The tag 503 is a pair of a key and a value, and information added to the resource. A "Role" attribute indicates a role of the virtual machine(s), or the server component(s) in the processing system, and a value such as "Web" and "Batch" is set therefor. Further, a "Version" attribute is a key used to identify the management system 100, and indicates the version suggesting, for example, which environment the resource exists in, the Blue environment 330 or the Green environment 350. These items are referred to when the released production environment is switched, which will be described below.

FIG. 6 illustrates a monitoring state management table according to the present exemplary embodiment. The resource monitoring unit 402 manages information about a state of monitoring the resource, for example, as indicated by records 611 to 618. Items of the monitoring state management table include a monitoring condition name 601, a monitored resource 602, a monitored item 603, a previously measured value 604, and a number of successive times 605.

The monitoring condition name 601 is a name for identifying the monitoring condition. In the case of the monitoring condition generated by the stack reception unit 404, which will be described below, the stack ID 801 is added at the beginning of a character string indicating the monitoring condition name 601. The monitored resource 602 is information indicating the monitored resource that the resource monitoring unit 402 monitors. The monitored item 603 is information indicating the monitored item that the resource monitoring unit 402 monitors. For example, in the record 611, the monitored item 603 indicates that the resource monitoring unit 402 monitors the number of messages stored in a queue 333 or 353 identified by "R04". The previously measured value 604 is a value acquired by the resource monitoring unit 402 at the time of previous measurement with respect to the monitored item 603 indicated in this record. The number of successive times 605 is the number of times that the same monitoring condition is satisfied in a row. For example, the number of successive times 605 is used, for example, when the management system 100 is set to notify the system administrator if the same monitoring condition is satisfied twice in a row at an interval of 300 seconds.

FIG. 7 illustrates an auto-scaling state management table according to the present exemplary embodiment. The auto-scaling management unit 403 manages the information regarding the auto-scaling of the auto-scaling group or the server component, for example, as indicated by records 711 to 718. Items of the auto-scaling state management table include an auto-scaling management ID 701, a type 702, a number of required devices 703, a number of operating devices 704, a specification 705, an operation performed last time 706, and a tag 707.

The auto-scaling management ID 701 is an ID of the auto-scaling group or the resource ID of the server component that should be managed in terms of the auto-scaling state. In the case of the auto-scaling group generated by the stack reception unit 404, the stack ID 801 is added at the beginning of a character string indicating the auto-scaling management ID. The type 702 stores a type of the resource that is a target of the auto-scaling management, which is specified with the auto-scaling management ID 701. Examples of the type of the resource include the auto-scaling group, the load balancer, and the queue.

The number of required devices 703 is the number of virtual machines defined to be necessary in the auto-scaling group. The number of operating devices 704 is the number of virtual machines associated with the auto-scaling group and being in operation. The auto-scaling management unit 403 controls the number of operating devices 704 so that the number of operating devices 704 matches the number of required devices 703. The specification 705 indicates a processing capability of the virtual machines.

The operation performed last time 706 is a control command held as the operation performed last time by the auto-scaling management unit 403 on the auto-scaling group, the server component, or the like. The tag 707 is a tag added to the auto-scaling group or the server component specified with the auto-scaling management ID 701. A "Role" attribute and a "Version" attribute are similar to the "Role" attribute and the "Version" attribute described in the description of the tag 503, respectively.

For example, the server component such as the load balancer and the queue, or the like may be set in advance by the cloud service vendor, and provided to the system administrator as a managed service. In such a case, the management system 100 may refrain from disclosing the setting and the state of the auto-scaling to the system administrator. Further, the management system 100 may be configured in such a manner that the system administrator does not configure the setting regarding the auto-scaling function, and the management system 100 automatically sets and manages the auto-scaling.

FIG. 8 illustrates a stack information management table according to the present exemplary embodiment. Upon receiving the request to generate the stack, the stack reception unit 404 generates the stack ID 801 for identifying the stack, and manages the stack ID 801 in association with the generated virtual machine, the generated server component, and other setting information. The stack reception unit 404 holds the stack template in association with the stack ID 801, for example, as indicated by records 811 to 823. Items of the stack information management table include the stack ID 801 and a resource ID 802.

The stack ID 801 is an identifier of the stack that is issued by the stack reception unit 404. The resource ID 802 is an identifier of the resource of the virtual machine 332, 334, 352, or 354, or the server component generated in association with the stack. If the system administrator specifies deletion of the stack, the stack reception unit 404 refers to the stack information management table, and requests deletion of the resources associated with the stack. Further, the stack reception unit 404 requests deletion of the various kinds of setting information registered by the resource monitoring unit 402 and the auto-scaling management unit 403 in the respective tables illustrated in FIGS. 5 to 7.

The system administrator can construct the processing system while combining a plurality of stacks. For example, the system administrator can combine a stack including a database server or the like that will not be replaced at the time of the version upgrade of the system, and a stack including a web server or the like that will be replaced at the time of the version upgrade.

FIGS. 9A, 9B, 9C, and 9D illustrate the stack template according to the present exemplary embodiment. The stack reception unit 404 receives the stack template from, for example, the computer 110 operated by the system administrator. Numbers placed at a left end indicate line numbers, and the same applies to a stack template illustrated in FIG. 12. FIG. 9A illustrates line 2 to line 53 in the stack template. FIG. 9B illustrates a line 54 to line 97 in the stack template. FIG. 9C illustrates line 98 to line 140 in the stack template. FIG. 9D illustrates line 141 to line 185 in the stack template. In the following description, the stack template will be described, extracting portions relevant to the present exemplary embodiment. The virtual machines, and the server components to be generated as the stack, the setting of the auto-scaling function, and the like are specified in line 2 to line 185.

Generation of a load balancer named WebLB is specified, and the values of the "Role" attribute and the "Version" attribute are specified to be "Web" and "100", respectively, as the tag, in line 3 to line 25 illustrated in FIG. 9A. The stack reception unit 404 requests the resource generation unit 401 to generate a load balancer. The information about the generated load balancer is registered into the resource information management table (FIG. 5), and the association between the stack ID 801 and the resource ID 802 is registered into the stack information management table (FIG. 8). An auto-scaling group named WebAutoScalingGroup is set in line 26 to line 46. The connection target is specified to be the load balancer: WebLB, and a minimum number (MinSize) and a maximum number (MaxSize) of the virtual machines are specified to be 2 and 10, respectively. The number of initially required devices (DesiredCapacity) is specified to be 2, and a launch setting (LaunchConfigurationName) of the virtual machine is specified to be "WebLaunchConfig". The values of the "Role" attribute and the "Version" attribute are specified to be "Web" and "100", respectively, as the tag.

The launch of the virtual machine named "WebLaunchConfig" specified in WebAutoScalingGroup is set in line 47 to line 53. Use of "imageWeb100" as an OS image (ImageID) is specified, and "Large" is specified as an instance type (InstanceType), which specifies the specification of the CPU, the memory, and the like.

In this example of the stack template, the stack reception unit 404 registers the auto-scaling group S01_WebAutoScalingGroup to the auto-scaling management unit 403, and sets the number of required devices to 2 (adds the stack ID 801 at the beginning of the character string). Since the number of operating devices is 0 while the number of required devises is set to 2, the auto-scaling management unit 403 generates the virtual machine 332 or 352 based on WebLaunchConfig to add the generated virtual machine to the auto-scaling group until the number of operating devices reaches the number of required devices.

Auto-scaling policies associated with the auto-scaling group named WebAutoScalingGroup are specified in a line 54 to line 71 in FIG. 9B. WebScaleUpPolicy is specified so as to cause the operation of increasing the number of required devices by one ("ScalingAdjustment": "1") to be executed. Further, WebScaleDownPolicy is specified so as to cause the operation of reducing the number of required devices by one ("ScalingAdjustment": "−1") to be executed. WebScaleUpPolicy is the instruction for the setting of the virtual server group that the stack reception unit 404 configures based on the stack template.

Monitoring and notification conditions associated with the auto-scaling group named WebAutoScalingGroup are set in line 72 to a line 97 illustrated in FIG. 9B.

In WebCPUAlarmHigh, an average of the CPU usage rate ("CPUUtilization") is specified to be monitored as the monitored item (MetricName) with respect to "WebAutoScalingGroup". Then, the adjustment of the resources is specified to be carried out with reference to the auto-scaling policy named "WebScaleUpPolicy" specified in AlarmAction, if the average of the CPU usage rate exceeds 90%, which is a threshold value, twice at the interval of 300 seconds.

In this example of the stack template, the stack reception unit 404 registers the monitoring condition S01_WebCPUAlarmHigh and the like in the resource monitoring unit 402.

A queue that should be generated is specified in line 98 to line 113 in FIG. 9C. In this example, generation of a queue named "BatchQueue" is specified. The values of the "Role" attribute and the "Version" attribute are specified to be "Batch" and "100", respectively, as the tag.

In this example of the stack template, the stack reception unit 404 requests the resource generation unit 401 to generate the queue. The information about the generated queue is registered into the resource information management table (FIG. 5), and the association between the stack ID 801 and the resource ID 802 is stored into the stack information management table (FIG. 8).

An auto-scaling group named BatchAutoScalingGroup is specified, and a minimum number (MinSize) and a maximum number (MaxSize) of the virtual machines are specified to be 1 and 10, respectively, in line 114 to line 133 in FIG. 9C. The number of initially required devices (DesiredCapacity) is specified to be 1, and a launch setting (LaunchConfigurationName) of the virtual machine is specified to be "BatchLaunchConfig". The values of the "Role" attribute and the "Version" attribute are specified to be "Batch" and "100", respectively, as the tag. BatchLaunchConfig is the instruction for the setting of the batch processing system that sequentially performs processes accumulated in the queue that correspond to the received requests.

The launch of the virtual machine named "BatchLaunchConfig" specified in BatchAutoScalingGroup is set in line 134 to the line 140 in FIG. 9C.

Auto-scaling policies associated with the auto-scaling group named BatchAutoScalingGroup are specified in line 141 to line 158 illustrated in FIG. 9D. BatchScaleUpPolicy is specified so as to cause the operation of increasing the number of required devices by one ("ScalingAdjustment": "1") to be executed. Further, BatchScaleDownPolicy is specified so as to cause the operation of reducing the number of required device(s) 703 by one ("ScalingAdjustment": "−1") to be executed.

Monitoring and notification conditions associated with the auto-scaling group named BatchAutoScalingGroup are specified in line 159 to line 184. In BatchQueueAlarmHigh, an average of the number of messages ("NumberOfMessages") is set to be monitored as the monitored item (MetricName) with respect to "BatchQueue". Then, the auto-scaling policy named "BatchScaleUpPolicy" specified in AlarmAction is set to be carried out, if the average of the number of messages exceeds 100, which is a threshold value, twice at the interval of 300 seconds.

FIG. 10 is a flowchart illustrating a flow of the processing for switching the released production environment according to the present exemplary embodiment. The resource manager 303 performs the processing for switching the released production environment.

In step S1001, the resource manager 303 starts the processing for adjusting the resource amount in the Green environment 350 in response to the instruction from the system manager 300. In step S1002, the resource manager 303 receives, from the system administrator, an input specifying the Blue environment 330 and the Green environment 350 that are switching targets. The system administrator specifies the Blue environment 330 and the Green environment 350 that are the switching targets by operating the computer 110, and the switching unit 405 receives the request including this input specifying the Blue and Green environments 330 and 350.

As a method for specifying the Blue and Green environments 330 and 350, the system administrator may specify the respective stack IDs 801 of the Blue environment 330 and the Green environment 350, or may specify the Blue environment 330 and the Green environment 350 with Keys and Values of the tags thereof. Key is the attribute of the tag, and Value is the value of the attribute. If the system administrator specifies the Blue environment 330 and the Green environment 350 with the stack IDs 801, the system administrator specifies the Blue environment 330 and the Green environment 350 by, for example, specifying S01 and S02 as the stack IDs 801 of the Blue environment 330 and the Green environment 350, respectively. The system administrator may specify a plurality of stacks at a time. If the system administrator specifies the tag, the system administrator uses Key indicating "Version" to identify the tag, and specifies the Blue environment 330 and the Green environment 350 by, for example, specifying "100" and "101" for the Blue environment 330 and the Green environment 350, respectively.

Hereinafter, the present flowchart will be described assuming that "100" and "101" are set for Key of the Blue environment 330 and Key of the Green environment 350, respectively, by way of example. Further, in this case, the ID of the stack that the auto-scaling group, the virtual machines, and the server components belong to can be acquired from the head of the character string indicating the auto-scaling management ID 701, the stack ID 801, or the like.

In step S1003, the switching unit 405 acquires the information about the auto-scaling states in the specified Blue environment 330 and Green environment 350 from the auto-scaling management unit 403. As the information with respect to the Green environment 350, the "Version" attribute is indicated as "101". At this time, the switching unit 405 acquires information regarding the adjustment of the resource amount including ("Version": "101") in the tag 707 (the records 715 to 718) from the auto-scaling state management table (FIG. 7). The switching unit 405 may acquire only the information with respect to the specified Blue environment 330. Further, the information with respect to the Blue environment 330 and the Green environment 350 may be stored in the database 302 in the management system 100, or may be stored in a storage device prepared outside the management system 100.

Subsequently, the resource manager 303 repeats processing from steps S1004 to S1007 for each of the auto-scaling groups and the server components in the Green environment 350. In step S1007, the processing exits the loop upon completion of the processing on all of the auto-scaling groups and the server components.

In step S1005, the switching unit 405 disables the automatic adjustment function based on the auto-scaling policy. The disabled automatic adjustment function may be only the automatic adjustment function based on the auto-scaling policy defining the scaling-in or the scaling-down. The auto-scaling policy handled as a target of the scaling-in is the auto-scaling policy specifying a negative value as the number of virtual machines to be added or deleted (ScalingAdjustment) in the setting of the auto-scaling. A timing of disabling the automatic adjustment function is not limited to step S1005, and may be any timing during a period from the generation of the Green environment 350 until the start of the processing for adjusting the resource amount in the Green environment 350.

When the released production environment is switched from the Blue environment 330 to the Green environment 350, the number of virtual machines in the Green environment 350 should be increased and/or the server component(s) in the Green environment 350 should be scaled up in a state where only a light load is imposed on the Green environment 350. Disabling the auto-scaling policy defining the scaling-in prevents the Alarm calling the scaling-in from being issued after the resources in the Green environment 350 is increased, and thus the number of virtual machines in the Green environment 350 from being reduced and/or the server component(s) in the Green environment 350 from being scaled down. Further, the switching unit 405 may be also configured to set the application of the auto-scaling policy to the auto-scaling group so as to be disabled for a certain predetermined time period, when the auto-scaling policy is applied to the auto-scaling group.

Subsequently, in step S1006, the resource generation unit 401 performs the processing for adjusting the resource amount in the Green environment 350. The processing for adjusting the resource amount in the Green environment 350 will be described below with reference to FIG. 11A.

If the processing is completed for all of the auto-scaling groups and the server components in step S1007, the processing proceeds to step S1008.

In step S1008, the switching unit 405 performs the processing for switching the released production environment from the Blue environment 330 to the Green environment 350. The switching unit 405 switches the released production environment by the method described above in the paragraphs describing the switching unit 405. In particular, the processing for switching the released production environment refers to, for example, the processing for changing the record in the DNS 301 from the record indicating the Blue environment 330 to the record indicating the Green environment 350. This processing results in the switching of the released production environment that receives and processes the requests transmitted from the external network. Further, after switching the released production environment, the switching unit 405 enables the automatic adjustment function disabled in step S1005.

FIG. 11A is a flowchart illustrating a flow of the processing for adjusting the resource amount in the Green environment 350 according to the present exemplary embodiment, and illustrates a flow of processing for adjusting the resource amount in the Green environment 350 with use of a migration method based on "application of the number of required devices". The processing for adjusting the resource amount in the Green environment 350 is performed for each of the auto-scaling groups and the server components in the Green environment 350.

The "application of the number of required devices" means a migration method that applies the number of virtual machines required in the Blue environment 330 to the Green environment 350. In steps S1101 to S1104, the resource manager 303 performs the processing for adjusting the resource amount in the Green environment 350 by the migration method based on the "application of the number of required devices". The "application of the number of required devices" is suitable in the case of application to, for example, the auto-scaling group including a plurality of virtual machines.

In step S1102, the switching unit 405 acquires the number of required devices 703 of the auto-scaling group or the server component in the Blue environment 330 in which the value of the "Role" attribute is the same as the value set to the auto-scaling group, the server component, or the like that is a repetition target.

The switching unit 405 searches for the auto-scaling group or the server component for which the tag indicating the Blue environment 330 (the "Version" attribute is "100") is contained in the tag 707, and the value of the "Role" attribute is the same, from the auto-scaling management unit 403. For example, in the case of the auto-scaling group S02_WebAutoScalingGroup, the value of the "Role" attribute is "Web". Therefore, the switching unit 405 selects S01_WebAutoScalingGroup in the row 711, for which ("Role":"Web") and ("Version":"100") are contained in the tag 707, and the same type is specified in the type 702. The switching unit 405 acquires "5", which is the value of the number of required devices 703 of S01_WebAutoScalingGroup.

Subsequently, in step S1103, the resource generation unit 401 adjusts the resource amount with respect to the auto-scaling group or the server component in the Green environment 350. For example, "5" is set as the number of required devices 703 of the auto-scaling group S02_WebAutoScalingGroup (the record 715). More specifically, the number of required devices 703 of the auto-scaling group or the server component in the Green environment 350 is set based on the number of required devices of the auto-scaling group or the server component in the Blue environment 330, which has been acquired in step S1102. The auto-scaling management unit 403 detects that the number of operating devices (=2) of the auto-scaling group S02_WebAutoScalingGroup does not reach the number of required devices (=5). Then, the auto-scaling management unit 403 adds, to the auto-scaling group, the virtual machine 352 generated according to the launch setting (WebLaunchConfig) of the virtual machine 352 for WebAutoScalingGroup in the stack S02 that the auto-scaling group belongs to. The number of operating devices 704 reaches "5" in the end, by which the number of required devices 703 in the Blue environment 330 is applied to the Green environment 350.

The number of required devices 703 in the Blue environment 330 does not have to be applied to the Green environment 350 as it exactly is as the number of required devices 703 in the Blue environment 330. For example, the number of required devices 703 in the Green environment 350 may be set based on the number of required devices 703 in the Blue environment 330 and the information indicating the specification 705 of the virtual machines in the Green environment 350.

The number of virtual machines put into operation may be larger than the number of devices required to process the load imposed on the Blue environment 330, so as to allow the Blue environment 330 serving as the current released production environment to have a generous processing capability including some extra. In this case, the switching unit 405 may set the number of required devices 703 in the Green environment 350 in consideration thereof.

The system manager 300 may predict the amount of requests when the released production environment will be switched, based on the amount of requests received by the Blue environment 330 during a predetermined time period before the released production environment is switched. For example, the system manager 300 calculates a slope that represents an increase or a decrease in the amount of requests at the time of the acquisition of the information regarding the adjustment of the resource amount in the Blue environment 330, with use of a graph indicating the number of requests per unit time. The system manager 300 may determine the number of required devices in the Green environment 350 further in consideration of the increase or the reduction in the number of requests in addition to the number of required devices in the Blue environment 330. The same applies to application examples that will be described below.

In step S1104, the processing returns to the flowchart of FIG. 10, and proceeds to the next step.

In the present exemplary embodiment, before the released production environment is switched from the first processing system to the second processing system, the number of virtual machines in the second processing system that is the processing system to which the released production environment is switched is adjusted so as to match the number of virtual machines in the first processing system. The present exemplary embodiment can prevent the second processing system from falling behind in processing the requests when the released production environment is switched.

A second exemplary embodiment is basically similar to the first exemplary embodiment, and therefore only a difference therebetween will be described. In the processing for adjusting the resource amount in the Green environment 350 in step S1006, the migration method based on the "application of the number of required devices" is used in the first exemplary embodiment, but a migration method based on "application of a load state" is used in the present exemplary embodiment. In the present exemplary embodiment, information indicating the monitored amount of requests or the monitored processing load is used for the processing for adjusting the resource amount in the Green environment 350.

FIG. 11B is a flowchart illustrating a flow of the processing in the Green environment 350 according to the present exemplary embodiment, and illustrates an example of a flow of the processing for adjusting the resource amount in the Green environment 350 by the migration method based on the "application of the load state". The processing for adjusting the resource amount in the Green environment 350 is performed for each of the auto-scaling groups and the server components in the Green environment 350.

The "application of the load state" means a migration method that applies the information indicating the load state in the Blue environment 330 to the Green environment 350. In steps S1111 to S1115, the resource manager 303 performs the processing for adjusting the resource amount in the Green environment 350 by the migration method based on the "application of the load state". The "application of the load state" is suitable in a case where it is not appropriate to use the method that applies the number of required devices 703 in the Blue environment 330 thereto as it is, such as when there is a difference between the Green environment 350 and the Blue environment 330 in terms of the server configuration, the specification of the virtual machine, and/or the like. The "application of the load state" can be also used in a case where the information indicating the number of required devices 703 cannot be acquired.

In step S1112, the switching unit 405 acquires the information indicating the load state of the auto-scaling group or the server component in the Blue environment 330.

For example, in the case of the auto-scaling group S02_WebAutoScalingGroup, the auto-scaling policies associated therewith are WebScaleUpPolicy and WebScaleDownPolicy. Further, the monitoring conditions associated therewith are WebCPUAlarmHigh and WebCPUAlarmLow, and the switching unit 405 searches for these two monitoring conditions. In the case of a queue 353 identified by R14, two monitoring conditions S02_BatchQueueAlarmHigh and S02_BatchQueueAlarmLow are associated therewith. The switching unit 405 acquires the information about the auto-scaling state of the auto-scaling group or the server component in the Blue environment 330 of which the value of the "Role" attribute is the same as that of the resource specified as the monitored resource 602 under these monitoring conditions.

For example, in the case of the queue 353 identified by R14, the value of the "Role" attribute can be recognized to be "Batch" from the tag information of R14 by referring to the record 522 in the resource information management table (FIG. 5). The switching unit 405 finds out that R04 placed in the row 514 is the queue 333 in the Blue environment 330 for which the value of the "Role" attribute is "Batch", and acquires the load state of R04 (NumberOfMessages).

Subsequently, in step S1113, the switching unit 405 determines whether the resource amount in the Green environment 350 should be adjusted based on the information indicating the load state in the Blue environment 330, such as the amount of requests and the processing load, which has been acquired in step S1112.

For example, in the case of the queue 353 identified by R14, the switching unit 405 determines whether the condition S02_BatchQueueAlarmHigh or S02_BatchQueueAlarmLow is satisfied based on the load state of the queue 333 identified by R04. In a case where the management system 100 is set to measure the load state a plurality of times at a specified interval, the switching unit 405 may be configured to measure the load state a plurality of times or can be also configured to measure the load state once in place thereof. There may be prepared an auto-scaling policy that is referred to only when the released production environment is switched.

If the switching unit 405 determines that the resource amount in the Green environment 350 should be adjusted (YES in step S1113), the processing proceeds to step S1114. Then, the resource generation unit 401 adjusts the resource amount in the Green environment 350. On the other hand, if the switching unit 405 determines that the resource amount in the Green environment 350 does not have to be adjusted (NO in step S1113), the processing proceeds to step S1115.

In step S1115, the processing returns to the flowchart of FIG. 10, and then proceeds to the next step.

The resource manager 303 may set the number of required devices 703 and/or the specification 705 in the Green environment 350 in such a manner that the Green environment 350 has a generous processing capacity with some extra added to the processing capacity of the Blue environment 330.

In the case of the auto-scaling group, the resource manager 303 sets the number of required devices 703 or the like based on the auto-scaling policy associated with the monitoring condition with respect to which the load state has reached the upper limit in step S1113. At this time, the resource manager 303 sets the number of required devices 703 or the like in such a manner that the amount of requests received by the load balancer 331 in the Blue environment 330, and the amount of requests processable in the Green environment 350 match each other. The system administrator may be unable to specify the setting of the auto-scaling due to, for example, the server component that is provided as the managed service, such as the queue. In such a case, the resource manager 303 calculates the number of required devices and/or the specification to apply them to the server component based on the setting managed within the auto-scaling management unit 403. The system manager 300 may predict the amount of requests when the released production environment will be switched, based on the amount of requests received by the Blue environment 330 during a predetermined time period before the released production environment is switched. The system manager 300 may determine the amount of requests expected to be processable by the Green environment 350 further in consideration of the increase or the reduction in the amount of requests in addition to the amount of requests received by the load balancer 331 in the Blue environment 330. The same applies to the application examples that will be described below.

In the present exemplary embodiment, before the released production environment is switched from the first processing system to the second processing system, the resource amount in the second processing system is increased with use of the information indicating the load state in the first processing system. The processing for adjusting the resource amount by the auto-scaling that is set so as to be performed when the second processing system serves as the released production environment may be performed as a method for increasing the resource amount in the second processing system. Alternatively, as another method, the processing for adjusting the resource amount to be performed at the time of the processing for switching the released production environment may be set in advance, and this processing for adjusting the resource amount may be performed. The present exemplary embodiment can prevent the second processing system from falling behind in processing the requests at the time of switching the released production environment, even when there is a difference between the first processing system and the second processing system in terms of the server configuration, the specification of the virtual machine, and/or the like.

A third exemplary embodiment is basically similar to the first exemplary embodiment, and therefore only a difference therebetween will be described. In the processing for adjusting the resource amount in the Green environment 350 performed in step S1006, a migration method based on "application of the operation performed last time" is used in the present exemplary embodiment while the migration method based on the "application of the number of required devices" is used in the first exemplary embodiment, and the migration method based on the "application of the load state" is used in the second exemplary embodiment. In the present exemplary embodiment, the processing for adjusting the resource amount that has been performed last time in the Blue environment 330 is also performed in the Green environment 350 at the time of the acquisition of the information regarding the adjustment of the resource amount in the Blue environment 330.

FIG. 11C is a flowchart illustrating a flow of the processing in the Green environment 350 according to the present exemplary embodiment, and illustrates an example of a flow of the processing for adjusting the resource amount in the Green environment 350 by the migration method based on the "application of the operation performed last time". The processing for adjusting the resource amount in the Green environment 350 is performed for each of the auto-scaling groups and the server components in the Green environment 350.

The "application of the operation performed last time" means a migration method that applies the operation performed last time in the Blue environment 330 by performing the control command held as the operation performed last time on the server component or the like in the Blue environment 330, on the server component or the like corresponding thereto in the Green environment 350. In steps S1121 to S1124, the resource manager 303 performs the processing for adjusting the resource amount in the Green environment 350 by the migration method based on the "application of the operation performed last time". The "application of the operation performed last time" can be used even in a case where, for example, the information indicating the number of required devices and the information indicating the load state cannot be acquired.

In step S1122, the switching unit 405 acquires the operation performed last time 706 with respect to the server component in the Blue environment 330 of which the "Role" attribute is the same. At the time of the acquisition in step S1122, the operation performed last time 706 is the processing for adjusting the resource amount that has been performed last time on the server component in the Blue environment 330. The switching unit 405 acquires the operation performed last time 706 of the auto-scaling group or the server component in the Blue environment 330 of which the value of the "Role" attribute is the same as the value set to the auto-scaling group, the server component, or the like that is the repetition target. The switching unit 405 searches for the auto-scaling group or the server component for which the tag indicating the Blue environment 330 (the "Version" attribute is "100") is contained in the tag 707, and the value of the "Role" attribute is the same.

For example, in the case of a load balancer 351 identified by R11, because the value of the "Role" attribute is "Web", the switching unit 405 selects a load balancer 331 identified by R01 in the row 712, in which ("Role":"Web") and ("Version":"100") are contained in the tag 707, and the same type is specified in the type 702. Then, the switching unit 405 acquires ("Change Type Medium"), which is a value of the operation performed last time 706 of R01.

Subsequently, in step S1123, the auto-scaling management unit 403 performs an operation of the same setting of the auto-scaling function on the auto-scaling group, the server component, or the like in the Green environment 350.

For example, the auto-scaling management unit 403 performs the operation performed last time 706 ("Change Type=Medium"), which is the information acquired in step S1122, on the load balancer 351 identified by R11. In response to this operation, the load balancer 351 identified by R11 carries out the auto-scaling such as increasing the number of virtual machine(s) included therein.

In step S1124, the processing returns to the flowchart of FIG. 10, and then proceeds to the next step.

The system manager 300 may predict the amount of requests when the released production environment will be switched, based on the amount of requests received by the Blue environment 330 during a predetermined time period before the released production environment is switched. The system manager 300 may perform the processing for adjusting the resource amount in the Green environment 350 further in consideration of the increase or the decrease in the amount of requests in addition to the processing for adjusting the resource amount that has been performed last time in the Blue environment 330. The same applies to the application examples that will be described below.

In the present exemplary embodiment, the same operation as the processing for adjusting the resource amount that has been performed last time in the first processing system is performed in the second processing system according to the instruction to switch the released production environment. The present exemplary embodiment can prevent the second processing system from falling behind in processing requests at the time of switching the released production environment, even when the information indicating the number of virtual machines and the information indicating the load state cannot be acquired.

Application Example 1

In the processing for adjusting the resource amount in the Green environment 350 in step S1006, the switching unit 405 may control the switching according to an arbitrary setting defined in the stack template that specifies which migration method should be used among the migration methods according to the first exemplary embodiment to the third exemplary embodiment. This setting may be shared among all of the auto-scaling groups and the server components in the processing system. The present exemplary embodiment will be described assuming that the migration method is set for each of the auto-scaling groups and the server components.

FIG. 12 illustrates an example of the stack template according to the present exemplary embodiment, and the migration method is written therein. The setting of the operation of reflecting the information about the auto-scaling state when the released production environment is switched between the Blue environment 330 and the Green environment 350 is specified in line 186 to line 199.

The setting regarding the migration method at the time of the processing for adjusting the resource amount in the Green environment 350 when the released production environment is switched is specified in the line 186 to line 199. For example, this setting is referred to when the switching unit 405 receives the instruction to switch the released production environment.

As an example of the setting, the operation with respect to the auto-scaling group for which "Web" is specified as the value of the attribute having Key indicating "Role" is set in line 187 to line 193. The "application of the number of required devices" ("CopyDesiredCapacity") is specified as the migration method (MigrateMethod) thereof.

The switching unit 405 selects the information with respect to the Blue environment 330 to refer to for the processing for adjusting the resource amount in the Green environment 350, thereby setting the migration method. First, the switching unit 405 searches for the auto-scaling group or the server component that complies with the migration method specified in the stack template for the Green environment 350 with respect to the auto-scaling group or the server component that is the repetition target. The switching unit 405 acquires the stack template for the Green environment 350 from the stack reception unit 404.

The auto-scaling group "S02_WebAutoScalingGroup" in the auto-scaling state information 715 has the "Role" attribute in which the value is set to "Web", and complies with a first migration setting specified in line 187 to line 193 in the stack template. Then, this migration method is the "application of the number of required devices". The switching unit 405 may be configured to employ a predetermined migration method without referring to the stack template.

As another example of the setting, the operation with respect to the auto-scaling group for which "Batch" is specified as the value of the attribute having Key indicating "Role" is set in line 194 to line 198. "No setting" ("None") is specified as the migration method thereof (MigrateMethod).

The resource manager 303 applies the number of required devices 703 of the virtual machine 332 in the Blue environment 330 to the virtual machine 352 in the Green environment 350, but does not apply the number of required devices 703 of the virtual machine 334 in the Blue environment 330 to the virtual machine 354 in the Green environment 350. The virtual machine 332 is the web server or the like, and processes a large number of requests from the predetermined network system, so that the virtual machine 352 in the Green environment 350 should be prepared as many as the number of required devices 703 before the environment is switched. However, the virtual machine 334 is the batch server or the like, and processes the queued messages after receiving them, so that the number of the virtual machines 354 only has to be increased by the auto-scaling function in the Green environment 350. This is because the number of queued messages is not increased in synchronization with the number of requests from the predetermined network system. Therefore, the number of virtual machines 354 in the Green environment 350 does not have to be increased before the released production environment is switched.

The setting specified in line 194 to line 198 allows the system administrator to save a server fee of the batch server when the processing system is switched.

If the auto-scaling group or the server component does not comply with the migration method specified in the stack template, the switching unit 405 sets the migration method specified for each type such as the virtual machine and the server component by referring to FIG. 13.

FIG. 13 illustrates an example of a table indicating the migration method specified by the type of the server component according to the present exemplary embodiment. The switching unit 405 manages information about the migration method, like, for example, information indicated by records 1311 and 1312. A type 1301 indicates the type such as the virtual machine and the server component, and a migration method 1302 indicates the migration method specified by type. For example, when determining the migration method for the load balancer 351 identified by R11 as the resource ID 501, the switching unit 405 refers to the row 1311 illustrated in FIG. 13, and determines to use the "application of the operation performed last time" as the migration method. On the other hand, in the case of the queue 353 identified by R14, the switching unit 405 refers to the row 1312, and determines to use the "application of the load state" as the migration method. If the migration method cannot be determined, the switching unit 405 sets the migration method to "None".

The present exemplary embodiment allows the migration method to be set for each group of the resources included in the processing system, and the processing for adjusting the resource amount to be performed according to the migration method set for each group when the released production environment is switched.

Application Example 2

A part of the processing illustrated in the flowcharts of FIGS. 10, and 11A to 11C may be performed by the system manager 300, instead of the resource manager 303.

In step S1008 illustrated in FIG. 10, the released production environment is switched from the Blue environment 330 to the Green environment 350 after the resource amount in the Green environment 350 is actually adjusted. It may take some time since the system manager 300 issues the instruction to adjust the resource amount to the resource generation unit 401 of the resource manager 303 until the resource amount is actually adjusted. Therefore, for example, the system manager 300 issues the instruction to switch the released production environment after confirming that the number of operating devices 704 matches the number of required devices 703 illustrated in FIG. 7.

Further, a timing when the resource amount in the Green environment 350 is adjusted after the switching instruction is issued may be immediately after the released production environment is actually switched. However, the resource amount in the Green environment 350 should be adjusted by the auto-scaling in time.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application 2014-254602, filed Dec. 16, 2014, and No. 2015-187460, filed Sep. 24, 2015, which are hereby incorporated by reference herein in their entirety.

What is claimed is:

1. A management system including a plurality of processing systems, each of which is able to become a request processing system, each including at least one or more virtual machines each configured to process a request, and a load distribution device configured to distribute the request to the virtual machine(s), wherein the request processing system is a system for processing one or more requests transmitted from a predetermined network system to the management system, the management system comprising:
a memory storing instructions; and
a processor which is capable of executing the instructions causing the management system to:
acquire information regarding adjustment of an amount of resources to be used for a first processing system as a current request processing system according to an instruction for switching the request processing system from the first processing system to a second processing system included in the plurality of processing systems; and
issue an instruction for increasing a number of the virtual machines in the second processing system as an adjustment instruction to adjust an amount of resources in the second processing system based on the acquired information,
wherein the processing system that processes the request transmitted from the predetermined network system is switched from the first processing system to the second processing system according to the issued adjustment instruction,
wherein, after the processing system that processes the request transmitted from the predetermined network system is switched from the first processing system to the second processing system, an adjustment function of automatically carrying out adjustment to reduce the amount of resources in the second processing system as the request processing system according to an amount of requests from the predetermined network system is enabled,
wherein the first processing system and the second processing system each include a request processing system including one or more virtual machines configured to receive the request from the load distribution device to process the request, and a batch processing system including one or more virtual machines configured to process a message corresponding to the request processed by the request processing system, and
wherein the adjustment instruction is issued for increasing the number of the virtual machines included in not the batch processing system but the request processing system in the second processing system and increasing the amount of resources.

2. The management system according to claim 1, wherein the instructions further cause the management system to issue an instruction for increasing an allocation of hardware resources to the virtual machine(s) in the second processing system as the adjustment instruction to adjust the amount of resources in the second processing system based on the acquired information.

3. The management system according to claim 1, wherein the resources used by each of the first processing system and the second processing system is provided by one or more server computers.

4. The management system according to claim 1, wherein the acquired information is at least one of the number of the virtual machines in the first processing system, an amount of the request received by the first processing system, and information indicating adjustment carried out last time in the first processing system.

5. The management system according to claim 4,
wherein the processing system is managed while being divided into a plurality of groups each including at least any of one or more virtual machines and one or more load distribution devices,
wherein the instructions further cause the management system to set any one of the number of the virtual machines in the first processing system, the amount of the request received by the first processing system, and the information indicating the adjustment carried out last time in the first processing system, as the information with respect to the first processing system that is used for the adjustment instruction, for each of the groups of the resources used by the second processing system, wherein at least one of the number of the virtual machines in the first processing system, the amount of the request received by the first processing system, and the information indicating the adjustment carried out last time in the first processing system according to the setting is acquired, and wherein the adjustment instruction to adjust the amount of resources in the second processing system is issued based on the acquired information, for each of the groups of the resources used by the second processing system.

6. The management system according to claim 1, wherein, if an amount of the request received by the first processing system or information indicating a load for request processing that is imposed on the first processing system is acquired the adjustment instruction to adjust the amount of resources in the second processing system is issued based on the acquired information.

7. The management system according to claim 1, wherein, if information indicating adjustment carried out last time in the first processing system is acquired an instruction to carry out, in the second processing system, the adjustment indicated by the acquired information is issued as the adjustment instruction to adjust the amount of resources in the second processing system.

8. The management system according to claim 1, wherein a version of an application running on a virtual machine(s) in the first processing system, and a version of an application running on a virtual machine(s) in the second processing system are different from each other.

9. A control method for controlling a management system including a plurality of processing systems, each of which can become a request processing system, each including at least one or more virtual machines each configured to process a request, and a load distribution device configured to distribute the request to the virtual machine(s), wherein the request processing system is a system for processing one or more requests transmitted from a predetermined network system to the management system, the control method comprising:

acquiring information regarding adjustment of an amount of resources to be used for a first processing system as a current request processing system according to an instruction for switching the request processing system from the first processing system to a second processing system included in the plurality of processing systems; and issuing an instruction for increasing a number of the virtual machines in the second processing system as an adjustment instruction to adjust an amount of resources in the second processing system based on the acquired information, wherein the processing system that processes the request transmitted from the predetermined network system is switched from the first processing system to the second processing system according to the issued adjustment instruction, wherein, after the processing system that processes the request transmitted from the predetermined network system is switched from the first processing system to the second processing system, an adjustment function of automatically carrying out adjustment to reduce the amount of resources in the second processing system as the request processing system according to an amount of requests from the predetermined network system is enabled, wherein the first processing system and the second processing system each include a request processing system including one or more virtual machines configured to receive the request from the load distribution device to process the request, and a batch processing system including one or more virtual machines configured to process a message corresponding to the request processed by the request processing system, and wherein the adjustment instruction is issued for increasing the number of the virtual machines included in not the batch processing system but the request processing system in the second processing system and increasing the amount of resources.

10. The control method according to claim 9, further comprising issuing an instruction for increasing an allocation of hardware resources to the virtual machine(s) in the second processing system as the adjustment instruction to adjust the amount of resources in the second processing system based on the acquired information.

11. The control method according to claim 9, wherein the resources used by each of the first processing system and the second processing system is provided by one or more server computers.

12. The control method according to claim 9, wherein the acquired information is at least one of the number of the virtual machines in the first processing system, an amount of the request received by the first processing system, and information indicating adjustment carried out last time in the first processing system.

13. The control method according to claim 12, wherein the processing system is managed while being divided into a plurality of groups each including at least any of one or more virtual machines and one or more load distribution devices, wherein the control method further comprises setting any one of the number of the virtual machines in the first processing system, the amount of the request received by the first processing system, and the information indicating the adjustment carried out last time in the first processing system, as the information with respect to the first processing system that is used for the adjustment instruction, for each of the groups of the resources used by the second processing system, wherein at least one of the number of the virtual machines in the first processing system, the amount of the request received by the first processing system, and the information indicating the adjustment carried out last time in the first processing system is acquired according to the setting, and wherein, in the issuing, the adjustment instruction to adjust the amount of resources in the second processing system is issued based on the acquired information, for each of the groups of the resources used by the second processing system.

14. The control method according to claim 9, wherein, if an amount of the request received by the first processing system or information indicating a load for request processing that is imposed on the first processing system is acquired, in the issuing, the adjustment instruction to adjust the amount of resources in the second processing system is issued based on the acquired information.

15. The control method according to claim 9, wherein, if information indicating adjustment carried out last time in the first processing system is acquired, in the issuing, an instruction to carry out, in the second processing system, the adjustment indicated by the acquired information is issued as the adjustment instruction to adjust the amount of resources in the second processing system.

16. The control method according to claim 9, wherein a version of an application running on a virtual machine(s) in the first processing system, and a version of an application running on a virtual machine(s) in the second processing system are different from each other.

* * * * *